United States Patent
Winklhofer

(10) Patent No.: US 6,572,501 B2
(45) Date of Patent: Jun. 3, 2003

(54) METHOD AND DEVICE FOR REDUCING VIBRATIONS OF A CONTROL CHAIN IN A CAMSHAFT DRIVE OF AN INTERNAL COMBUSTION ENGINE

(76) Inventor: Gerhard Winklhofer, Amselweg 2, Krailling b-D-82152 (DE)

(*) Notice: Subject to any disclaimer, the term of this patent is extended or adjusted under 35 U.S.C. 154(b) by 0 days.

(21) Appl. No.: 10/039,658

(22) Filed: Jan. 3, 2002

(65) Prior Publication Data

US 2002/0128099 A1 Sep. 12, 2002

Related U.S. Application Data

(63) Continuation-in-part of application No. 09/549,355, filed on Apr. 14, 2000, now abandoned.

(30) Foreign Application Priority Data

Apr. 29, 1999 (DE) .......................................... 199 19 594

(51) Int. Cl.⁷ ................................................ F16H 7/08
(52) U.S. Cl. ........................................................ 474/102
(58) Field of Search ................................ 474/102, 105, 474/106

(56) References Cited

U.S. PATENT DOCUMENTS

| | | | | |
|---|---|---|---|---|
| 4,478,595 A | | 10/1984 | Hayakawa et al. | |
| 4,878,461 A | * | 11/1989 | Sapienza et al. | 123/90.15 |
| 5,073,150 A | | 12/1991 | Shimaya | |
| 5,159,904 A | * | 11/1992 | Ingold | 123/90.15 |
| 5,347,846 A | * | 9/1994 | Kitano et al. | 73/35.04 |
| 5,733,214 A | * | 3/1998 | Shiki et al. | 474/69 |
| 6,073,428 A | | 6/2000 | Diekhans | |
| 6,165,091 A | * | 12/2000 | Dinca et al. | 474/112 |

FOREIGN PATENT DOCUMENTS

| | | | | |
|---|---|---|---|---|
| DE | 4114716 A1 | | 5/1991 | |
| DE | 4134354 A1 | | 10/1991 | |
| DE | 19710965 C1 | | 3/1997 | |
| JP | 58-143107a | | 8/1983 | |
| JP | 61-153047 | * | 7/1986 | 474/153 |
| JP | 61-164850 | | 10/1986 | |
| JP | 4-31632 | * | 2/1992 | F02B/67/06 |
| JP | 10159919 A | | 6/1998 | |
| JP | 10-274052 | | 10/1998 | |

* cited by examiner

Primary Examiner—Thomas R. Hannon
Assistant Examiner—Vicky A. Johnson
(74) Attorney, Agent, or Firm—Marshall, Gerstein & Borun

(57) ABSTRACT

A method and a device for reducing the vibrations of a control chain in a camshaft drive of an internal combustion engine. At least one engine parameter is measured that is indicative of the vibrational state of the engine. The at least one engine parameter is used to determine the vibrational state and to adjust the tension of the control chain. Thus, the built-up of resonances and of strong vibrations may be avoided.

Figure 1:
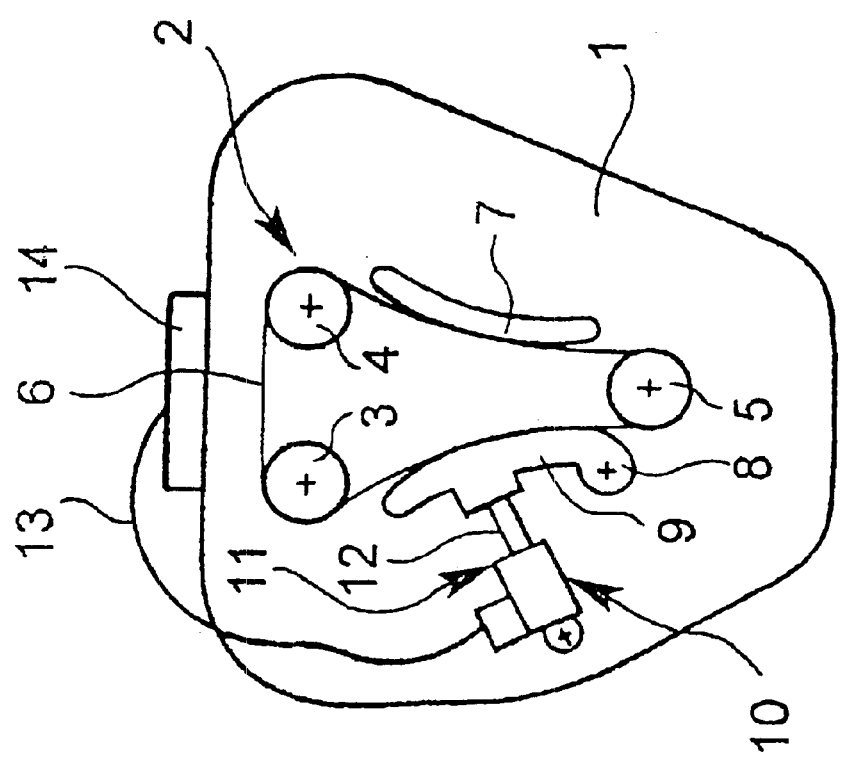

5 Claims, 3 Drawing Sheets

US 6,572,501 B2

METHOD AND DEVICE FOR REDUCING VIBRATIONS OF A CONTROL CHAIN IN A CAMSHAFT DRIVE OF AN INTERNAL COMBUSTION ENGINE

This is a continuation-in-part application of prior application Ser. No. 09/549,355, filed on Apr. 14, 2000 now abandoned.

FIELD OF THE INVENTION

The present invention relates to a method and a device for reducing vibrations of a control chain in a camshaft drive of an internal combustion engine by means of a chain tensioner.

BACKGROUND OF THE INVENTION

It is known in the prior art to use an electronic control apparatus for belt tensioners in automotive vehicles. Such endless belts are employed for driving accessory systems such as a water pump, a power steering pump, an alternator, a refrigerant compressor, and the like. One such control apparatus is described in U.S. Pat. No. 4,478,595 by Hayakawa et al. In the method and device of U.S. Pat. No. 4,478,595, a belt tensioner is mounted on an upper portion of the engine and engages the belt at a location between two driving pulleys for accessory systems under control of an electric control apparatus. The belt tensioner uses a stepper motor driving a screw shaft to displace an idler pulley essentially in a direction transverse to the running direction of the belt. By the displacement of the idler pulley, the tension in the belt is determined. In addition, the idler pulley is pressed against the belt with a compression spring, which is also displaced with the stepper motor together with the idler pulley and also contributes to the tensioning of the belt. Furthermore, the belt tensioner comprises a displacement sensor to pick up the displacement of the idler pulley. The displacement sensor is connected to the electronic control apparatus.

The electronic control apparatus of U.S. Pat. No. 4,478,595 comprises a microcomputer and an A/D converter. It is connected to sensors for determining the power put into the accessory systems, such as an ammeter for an alternator, a pressure sensor for the power steering system, an ammeter for the refrigerant compressor clutch, and to other sensors, such as a speed sensor to determine the actual rotational speed of the engine crankshaft and the displacement sensor in the belt tensioner.

The sensors, the electronic control apparatus, and the belt tensioner described in U.S. Pat. No. 4,478,595 are combined to form a control system to optimally set the tensioning force in the belt so that an optimum power transmission is effected and the durability of the belt is enhanced.

There are several problems with the belt drive disclosed in U.S. Pat. No. 4,478,595. First, special sensors are needed to furnish the parameters used for controlling the belt tension. These parameters are not part of customary electronic engine systems and in particular may not be used for controlling the tension of drives other than an accessory drive. Second, the belt does not exhibit a high mechanical strength if it is subjected to high temperatures. In modern engines, however, the thermal load of drive systems used therein has increased considerably, due to the lack of space, which is a problem to the provision of sufficient heat sinks. Finally, the drive shown in U.S. Pat. No. 4,478,595 is not concerned with the reduction of the vibrations generated by the belt drive. The vibrational characteristics of the belt drive of U.S. Pat. No. 4,478,595, however, do not meet the requirements for today's smoothly running automotive engines and their decreased vibrations and sound emissions.

To meet the demands on the thermal stability of the drives used in modern engines, chain drives, for instance for camshaft drives, are now in general use in many internal combustion engine constructions. For example, in an internal combustion engine having two overhead camshafts the chain is guided via a chain gear connected to the crankshaft and via the two adjacent camshaft chain gears.

To reduce the vibrations of the chain as much as possible, the chain is normally guided at one side along a stationary slide rail of a suitable sliding material. Opposite to said stationary slide rail is arranged a movable contact-pressure rails which is pressed by means of a chain tensioner onto the chain.

There are many different chain tensioner designs, which are to meet the different demands made on their use. Other chain tensioners are for instance known whose tensioning force is applied with the help of an expansion element for compensating for temperature variations. As a rule, the chain tensioners are based on the principle of combining a tension applied by means of a spring element and a damping action performed by means of a hydraulic construction. It is also known that the damping means is coupled with the engine oil circuit to achieve a stronger damping action at higher speeds. The tensioning force, which is predetermined by the spring means, is thereby only influenced to a limited extent.

An example of a self-adjusting belt tensioners that uses both a spring element and a self-adjustable hydraulic piston is known for example from U.S. Pat. No. 5,637,047, which is incorporated herein by reference.

In the chain tensioner of U.S. Pat. No. 5,637,047, a tensioner for a chain-type driving member includes a piston slidably received in a pressure chamber of a housing and being biased by a spring in the pressure chamber in a direction out of the housing against a chain. The pressure chamber is connected to the hydraulic circuit of the engine via a backpressure valve that is closed by the pressure in the pressure chamber. If the tension in the chain decreases, the piston is moved by the spring out of the housing, thus increasing the volume of the pressure chamber, reducing the pressure therein and opening the backpressure valve. In this way, hydraulic fluid is supplied to the pressure chamber to adjust the piston. To avoid high pressures that may damage or wear the chain, a relief-valve is also provided. The relief valve opens if a predetermined pressure is exceeded in the pressure chamber.

The tensioner of U.S. Pat. No. 5,637,047 has been optimized to decouple the resonant frequencies of the backpressure valve and the relief-valve from the resonant frequencies of the motor, which previously affected the operation of such valves. The tensioner disclosed in U.S. Pat. No. 5,637,047 needs, however, further improvement in its damping characteristics if the chain exhibits large vibrations. Another type of chain tensioners, such as for example known from U.S. Pat. No. 6,193,623, uses the discharge of hydraulic fluid such as engine oil from a pressure chamber via at least one leak gap to dampen the vibrations. This method, however, also needs to be improved in view of high vibrations of the chain at selected frequencies or at particular operational conditions.

SUMMARY OF THE INVENTION

In view of the prior art, it is therefore the object of the present invention to provide a method and a device of the above-mentioned type, which improves the vibration behavior of a chain control chain in a camshaft drive of an internal combustion engine.

This object and others, which will become apparent hereinafter, are attained in accordance with the invention by determining a vibrational state of the combustion engine by measuring at least one engine parameter, and adjusting the tensioning force generated by a chain tensioner depending on the determined vibrational state to reduce said vibrations of said control chain.

The term engine parameter is used for a parameter that is used to define the operational state of the engine and to control the operation of the engine, such as the engine torque, the engine speed, the engine and oil temperatures, the mixture of the air-fuel mixture and knocking and misfire signals. It is essential to the invention that an engine parameter is used that represents the vibrational state of the camshaft drive and of the engine. The vibrational state of these systems is defined by the frequency components of the vibrations, at least by a subset of these frequency components, e.g. the strongest components. As the vibrational state of the engine determines the possible excitation of resonances of the control chain, the tensioning force is adjusted depending on the vibrational state of the engine. Due to the adjustment of the tensioning force, the vibrational properties of the camshaft drive are changed and the built-up of resonances is avoided. The tensioning force is adjusted by operating the chain tensioner under control of the electronic control system This solution differs quite clearly from the solution as, for example, realized in U.S. Pat. No. 4,478,595, where the vibrational state of the engine neither can be determined nor plays a role in the adjustment of the tensioning force. Further, U.S. Pat. No. 4,478,595 does not use engine parameters, but parameters of the accessory equipment for determining the tension of a belt drive.

To determine the vibrational state of the engine, a predetermined relationship between the at least one engine parameter may be stored in the electronic control system. This predetermined relationship is a characteristic in the form of a table or a function or map. The characteristic may be used to determine the vibrational state of the engine by looking up a quantity indicative of the vibrational state of the engine depending on the at least one engine parameter. In particular, the at least one engine parameter may comprise at least one of the engine speed and the engine torque.

As a result, the device and method according to the invention actively influence the vibration behavior, for instance, of the chain drive, thereby ensuring an optimum chain tension at any given operational time. The tensioning device must be constructed such that it can actively adjust the tensioning force on the basis of control signals. The force adjusting operation as such can be carried out electrically or e.g. hydraulically, depending on the respective application.

To keep the number of additional components as small as possible in comparison with conventional internal combustion engines, it is useful according to a further embodiment that the control unit is connected to and/or integrated into the electronic engine system of the internal combustion engine that supplies the sensor data. As a rule, modern automotive vehicles are nowadays equipped with an engine control unit, which already determines all operational data, in particular with respect to the characteristic map. The vibration behavior of the engine can directly be inferred from said values: In response to said data the chain tensioner for instance, can then be controlled. Thus, a chain tensioner construction would be conceivable that is just connected to the electronic engine system by means of supply lines, whereby an automatic coupling with suitable sensors taken place.

To react as quickly as possible at any time and to permanently monitor the tensioning force it makes sense to use a control loop. To this end a control means may be provided for controlling the tensioning force in response to the sensors. Furthermore, it may be necessary to measure either the applied force, for instance, of the chain tensioner as such or the tensioning distance covered (or relative path) of the chain tensioner.

Although the tensioning device can also be operated pneumatically, hydraulically, mechanically or thermally (e.g. by means of an expansion element), the chain tensioner is actuable in one embodiment by means of an electric adjusting device for adjusting the tensioning force. The sensor signals can thus be used for directly controlling such an electric adjusting or lifting mechanism.

DETAILED DESCRIPTION OF THE DRAWINGS

Figure 2:
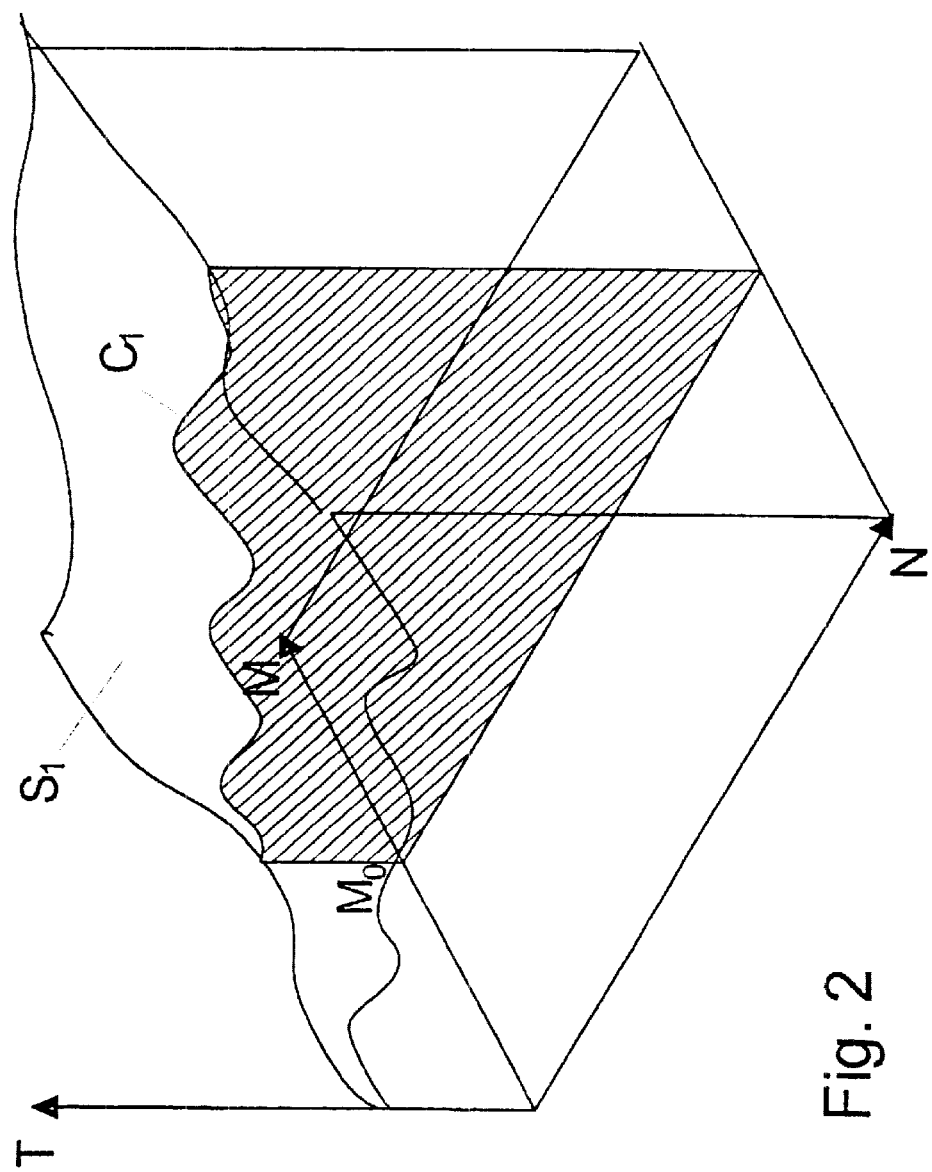
Figure 3:
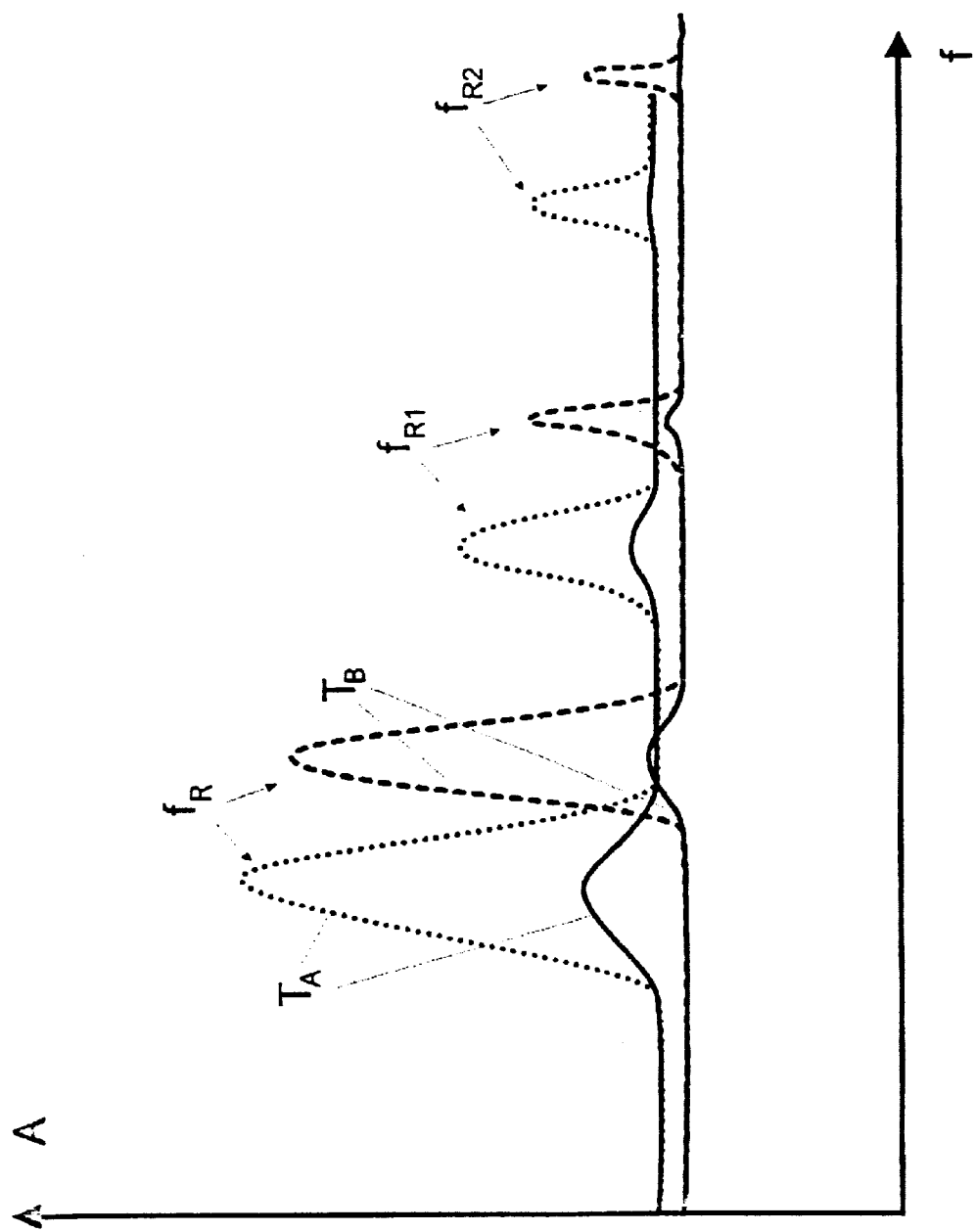

In the following, the invention is exemplarily explained in greater detail with reference to the drawings, in which FIG. 1 shows an embodiment according to the invention using a control chain for an engine block having chain gears and a control chain;

FIG. 2 shows an example of a characteristic used to control the chain tension;

FIG. 3 schematically shows some of the vibrational properties of a control chain.

DETAILED DESCRIPTION OF THE INVENTION

FIG. 1 shows a schematically illustrated engine block 1 whose front face has arranged thereon a camshaft drive 2. The camshaft drive 2 is normally covered by a cover or arranged in a passageway of the engine block 1 and is here shown in an open state for the purpose of simplification. The camshaft drive comprises two camshaft chain gears 3 and 4 and a crankshaft chain gear 5 that is positioned thereunder. A control chain 6, which is engaged by the teeth of the chain gears 3, 4 and 5, is placed around the chain gears 3, 4 and 5.

At least one of chain gears 3, 4, and 5 may be equipped with a rotational sensor that picks up the rotational speed and outputs an electric signal which is representative of the rotational speed. Usually, the crankshaft is equipped with such a rotational sensor as its rotational speed corresponds directly to the rotational speed of the engine.

The rotational speed in such rotational sensors that are widely know in the art may be either represented as the time interval between electric pulses, whereby, at each rotation, the sensor generates a predetermined number of impulses; or, alternatively, the rotational speed may be represented as a voltage value, which increases with the rotational speed.

A stationary guide rail 7 is arranged at the right side and a contact-pressure rail 9, which is pivotable about a pivot axis 8, is disposed at the left side. The contact-pressure rail 9 is pressed by means of the chain tensioner 10 with a predetermined force onto the control chain 6 so that a desired tension of the control chain 6 is obtained. The illustrated chain tensioner 10 is electrically actuable, with an electronic control system 11 suitable controlling the extension and the retraction of the contact-pressure plunger 12.

A person having average skill in the relevant art knows electrically actuable tensioners that can be used in the present invention. One such tensioner is disclosed in FIG. 4 of U.S. Pat. No. 4,478,595, which in its entirety is herein incorporated by reference. In the tensioner of U.S. Pat. No. 4,478,595, a movable member is displaced with respect to a housing by a stepper motor having a screw shaft. The tensioner further includes a spring arranged between the movable member and a piston, which also may move within the housing of the tensioner. Between the piston and the movable member, a displacement sensor in the form of a differential transformer is also provided to detect the relative displacement of the piston to the movable member so as to produce an analog signal indicative of the detected displacement. In the tensioner disclosed in U.S. Pat. No. 4,478,595, only the idler pulley must be replaced by the contact pressure rail 9, which is then connected to the piston using the plunger 12. Thus, by supplying an electric signal from the electronic control system 11 to the stepper motor in the tensioner, the contact-pressure rail 9 is displaced and the tensioning force acting on the contact-pressure rail 9 can be determined via the signal from the displacement sensor and may be controlled to a set value as described in U.S. Pat. No. 4,478,595.

The electronic control system 11 receives signals via a line 13 from an electronic engine system 14 and outputs an actuation signal to the chain tensioner 10. Instead of or in addition to the line 13A, radio or infrared transmission, etc. from the electronic engine system 14 to the electronic control system 11 may be used. If the camshaft drive 2 is equipped with the tensioner of U.S. Pat. No. 4,478,595, a signal representative from the displacement sensor may also be received by the electronic control system 11. It is to be noted that the electronic control system 11 may also be mounted or integrated at any other suitable place, e.g. it may be integrated with the electronic engine system 14.

The electronic engine system 14 receives characteristic quantities of the engine, such as the temperature, the rotational speed of the engine, the engine torque and other data, to control the operation of the engine. In the prior art, electronic engine systems using real-time measurement of the characteristic quantities are already known and in use. A person skilled in the art reading U.S. Pat. Nos. 3,927,528 and U.S. Pat. No. 6,259,986 B1, which both are respectively incorporated in their entirety herein by reference, knows how to measure engine parameters that are representative for the operational conditions of the engine, such as the temperature, the rotational speed of the engine, the engine torque and other data. From U.S. Pat. No. 3,927,528 and from U.S. Pat. No. 6,259,986 it is also known to a person skilled in the art, where electronic sensors are best be placed to obtain reliable measurements of the engine parameters.

According to the invention, the parameters measured by a customary electronic engine system 14 are processed in the electronic control system 11 and used to monitor the vibrational state of the engine and to adjust the tensioning force in the control chain so that the vibrations of the chain and the overall vibrations of the engine are reduced.

In one embodiment, the tensioning force to be generated by the tensioner 10 is determined using a predetermined relationship, the "characteristic", between the at least one parameter measured by the engine system 14 and the tensioning force. This characteristic is stored as a function, e.g. a power function, or as a table or map in the electronic control system 11. If a stored table is used, intermediate values that are not directly stored in the table, may be interpolated from the tabulated values.

An example of such a characteristic is shown in FIG. 2. There, a predetermined relationship in the form of a characteristic surface $S_1$ is shown, which describes the interdependence of the engine speed N, the engine torque M, and the tension force T necessary to avoid vibrations in the control chain 6. Instead of the tensioning force, a quantity representing the tensioning force may be used as well. Such a quantity may, for example, be the voltage supplied to the chain tensioner in order to generate the corresponding tension force.

The characteristic $S_1$ may be determined empirically in experiments, where the engine is run under controlled conditions and the engine torque and the engine speed are recorded together with the vibrational behavior of the chain and/or the engine. From this, it can be determined at which operational conditions, i.e. at which points on the surface $S_1$, the chain resonates. At these points, the tensioning force is changed to suppress the vibration.

To determine the tensioning force necessary to optimally suppress the vibrations at a specific operation point, i.e. a specific combination of an engine speed and an engine torque, a series of experiments may be run. The optimum tensioning force may be defined as the tensioning force which suppresses the vibration amplitudes by a given, otherwise arbitrary threshold, i.e. 3 dB, and, at the same time, is sufficiently low to avoid excessive wear and friction in the chain drive. It is to be noted that the vibrations of the chain are best monitored by an accelerometer on the chain itself or on an element, which is in direct contact with chain, such as the contact-pressure rail 9 or the plunger 12. Also, the overall vibrational behavior of the engine 1 may be monitored. In the latter case, the optimum tensioning force is determined by a predetermined reduction or improvement of the overall engine vibrations.

The characteristic $S_1$ is then stored in the electronic control system 11.

Other characteristics than shown in FIG. 2 may also be used. For example, a characteristic using the engine oil temperature $T_{OIL}$ as an additional engine parameter in addition to the engine speed N and the engine torque M may be used to look up optimum tension forces.

In this case, the tension T is a function of the three parameters $T_{OIL}$, N, and M. Usually, the characteristic will be made up from discrete points of measurements which will be used for interpolating values lying in between during operation. This interpolation is also done by the electronic control system 11. Other parameters that can be used in a characteristic may include the oil pressure, the displacement of the tensioner, the composition of the air-fuel mixture in the combustion engine, and vibrational information from a knocking and misfire sensor.

The method for adjusting the tensioning force according to one embodiment may be summarized as follows: First, the engine speed N and the engine torque M are measured using a standard electronic engine system. Thus, two values $N_0$ and $M_0$ are obtained. These values may have been time-averaged in order to smoothen out high-frequency noise. Then, using the two values $N_0$ and $M_0$ and the predetermined relationship of FIG. 2, which has been stored in the electronic control system, a quantity $T_0$ is obtained that is indicative of the vibrational state of the combustion engine 1 and, at the same time, is a quantity representing the tensioning force that is necessary to reduce the vibrations of the control chain at this particular vibrational state of the combustion engine. The quantity $T_0$ may, for instance be a current or voltage value that is sent directly to an actuator of the chain tensioner 10. Upon receipt of $T_0$, the chain tensioner 10 adjusts the tensioning force. Using the displacement sensor, the tensioning force can be controlled to be constant.

In particular, resonant frequency ranges of the system or other areas prone to vibrations can be determined on the basis of the characteristics so that tension of the chain can then be adjusted in a suitable way. With a very rapidly reacting control of the chain tensioner 10, a damping means could also be dispensed with. Strong impacts caused by the drive operation of an automotive vehicle could also be compensated thereby. In such a case an acceleration sensor should additionally be provided for transmitting the data to the electronic control system 11. The electronically controlled chain tensioner 10 may also be an active chain tensioner, which can vary both the drive force and the damping rate.

For example, the tensioning force may in one embodiment only be increased if the engine speed is in a harmonic relationship to the resonance frequency of the control chain 6. Such a harmonic relationship is characterized by one of these two frequencies being almost or exactly an integer multiple of the other. In this case, a resonance of the chain is very likely. A characteristic showing the variation of the tensioning force or a parameter indicative thereof over the engine speed is shown in FIG. 2 as a curve $C_1$ being part of the surface $S_1$. The curve $C_1$ is shown at one particular engine torque $M_0$. A curve such as $C_1$ may, however, also be used as the sole characteristic independent of the engine torque As can be seen from the curve $C_1$, the tensioning force is increased periodically. The areas where the tensioning force is increased corresponds to areas where the resonance frequency of the camshaft drive and the engine speed are harmonics. Between these areas, the tensioning force may be lowered.

In a further improvement of this method, the strongest frequencies of the engine vibrations may be measured using an accelerometer measuring vibrations on the engine block 1. In this improvement, the tensioning force is increased if the strongest frequencies exhibit a harmonic relationship to the resonant frequencies of the control chain 6. For example, an already present knocking and misfire sensor, such as generally described in U.S. Pat. No. 5,347,846, may be used to pick up the engine vibrations.

FIG. 3 schematically shows the operational principle of the device and the method according of the invention. In FIG. 3, the variation of the vibrational amplitude A for two different tensioning forces $T_A$ and $T_B$ of the control chain 6 is shown over the vibrational frequency f as a response to a pulse-like excitation of the chain. The bold lines in FIG. 3 show the change in amplitude if the method and the device according to the invention are used, the dotted lines show the characteristics of the device and method known from the prior art.

As can be seen from FIG. 3, the amplitude of the excited vibrations increases considerably close to the resonant frequency $f_R$ and its higher harmonics, $f_{R1}, f_{R2}, \ldots, f_{Rn}$. The frequencies of the higher harmonics $f_{Rn}$ differ by an integer number factor n+1 from the principal resonant frequency $f_R$, and usually have decreasing amplitude. Further, it can be seen from FIG. 3 that the principal resonant frequency $f_R$ itself and the amplitude depend on the tensioning force. With tensioning force increasing from $T_A$ to $T_B$, the resonant frequency $f_R$ increases, while usually the amplitude decreases, if a constant pulse-like excitation is used.

In operation, the control chain 6 reacts to any vibrational input from its surroundings, in particular from the engine 1 and the camshaft. If the vibrations of the surroundings contain a strong frequency component close to one of the resonant frequencies $f_R$, $f_{Rn}$, the chain 6 will pick up these vibrations and resonate. In resonance, the control chain 6 exhibits vibrations of high amplitude at the resonant frequencies, if no counter-measures are taken.

A reduction of the vibrations of the control chain 6 may be effected in two ways: First, the tension in the control chain may be varied by changing the tension generated by the tensioner 10. In this case, the resonant frequency of the chain is changed and shifted to a region, where there is no significant excitation, as can be seen from FIG. 3. At the same time, the amplitude of the vibrations is decreased due to the increased tension. Second, the dampening within the tensioner may be increased, i.e. the force reactive to the vibrational velocity of the chain may be increased. A change of the dampening may be achieved by using a hydraulic tensioner in which the leakage of the hydraulic oil is increased for increasing the dampening.

What is claimed is:

1. A method for reducing vibrations of a control chain in a camshaft drive of an internal combustion engine by means of a chain tensioner, said chain tensioner being controlled by an electronic control system and applying a tensioning force on said control chain, said electronic control system be operatively connected to at least one sensor for measuring at least one engine parameter of said internal combustion engine, comprising the following steps:

determining said vibrational state of said internal combustion engine from said measured at least one engine parameter, adjusting said tensioning force generated by said chain tensioner depending on said determined vibrational state to reduce said vibrations of said control chain, measuring at least one of the engine speed and the engine torque, wherein said step of adjusting said tensioning force comprises the step of changing said tensioning force if said engine speed and a resonance frequency of said control chain are in a harmonic relationship.

2. The method according to claim 1, wherein said step of determining the vibrational state of the combustion engine comprises the step of determining a quantity representing said vibrational state from a predetermined relationship between said at least one measured engine parameter and said quantity, said predetermined relationship having been stored in said electronic control system.

3. The method according to claim 2, wherein said quantity is both indicative of said vibrational state and of said tensioning force to be generated by said chain tensioner.

4. The method according to claim wherein said step of measuring said at least one engine parameter comprises the step of measuring at least one of the engine speed and the engine torque.

5. The method according to claim 1, wherein said step of determining said vibrational state comprises the step of measuring vibrations of at least one of said control chain and said internal combustion engine using an accelerometer.

* * * * *

UNITED STATES PATENT AND TRADEMARK OFFICE
CERTIFICATE OF CORRECTION

PATENT NO.   : 6,572,501 B2
DATED        : June 3, 2003
INVENTOR(S)  : Winklhofer It is certified that error appears in the above-identified patent and that said Letters Patent is hereby corrected as shown below:

<u>Column 8,</u>
Line 54, please replace "to claim wherein" with -- to claim 1, wherein --.

Signed and Sealed this

Sixteenth Day of September, 2003

JAMES E. ROGAN
*Director of the United States Patent and Trademark Office*